US006769712B2

United States Patent
Fischer et al.

(10) Patent No.: US 6,769,712 B2
(45) Date of Patent: Aug. 3, 2004

(54) APPARATUS WITH SPECIFIED RELATIONSHIP BETWEEN AN INSTRUMENT PANEL AND A DEPLOYMENT DOOR

(75) Inventors: Kurt F. Fischer, Oxford, MI (US); Gregory S. Bayley, Dryden, MI (US)

(73) Assignee: TRW Vehicle Safety Systems Inc., Lyndhurst, OH (US)

(*) Notice: Subject to any disclaimer, the term of this patent is extended or adjusted under 35 U.S.C. 154(b) by 0 days.

(21) Appl. No.: 09/966,203

(22) Filed: Sep. 28, 2001

(65) Prior Publication Data

US 2003/0062711 A1 Apr. 3, 2003

(51) Int. Cl.[7] .............................................. B60R 21/20
(52) U.S. Cl. ................................. 280/728.3; 280/732
(58) Field of Search ............................ 280/728.3, 732

(56) References Cited

U.S. PATENT DOCUMENTS

| | | | | |
|---|---|---|---|---|
| 3,622,176 A | * | 11/1971 | Byer ............................. | 180/90 |
| 5,121,942 A | * | 6/1992 | Warnick et al. ............ | 280/728.3 |
| 5,375,876 A | * | 12/1994 | Bauer et al. ............... | 280/728.3 |
| 5,378,014 A | * | 1/1995 | Cooper ....................... | 280/728.3 |
| 5,407,225 A | * | 4/1995 | Cooper ....................... | 280/728.3 |
| 5,456,487 A | * | 10/1995 | Daris et al. ................ | 280/728.3 |
| 5,456,490 A | * | 10/1995 | Carter et al. ............... | 280/728.3 |
| 5,851,023 A | * | 12/1998 | Nagata et al. .............. | 280/728.2 |
| 5,971,431 A | * | 10/1999 | Wohllebe et al. .......... | 280/728.3 |
| 6,109,645 A | * | 8/2000 | Totani et al. ............... | 280/728.3 |
| 6,164,685 A | | 12/2000 | Fischer et al. | |
| 6,193,271 B1 | * | 2/2001 | Shimane ..................... | 280/728.2 |
| 6,237,933 B1 | * | 5/2001 | Takahashi et al. ......... | 280/728.3 |
| 6,435,542 B2 | * | 8/2002 | Nakashima et al. ....... | 280/728.3 |
| 6,440,514 B1 | * | 8/2002 | Ueno et al. ................. | 280/728.3 |

OTHER PUBLICATIONS

Federal Motor Vehicle Safety Standards 208, as codified at 49 C.F.R. §571.208 (2000).

* cited by examiner

Primary Examiner—Paul N. Dickson
Assistant Examiner—Deanna Draper
(74) Attorney, Agent, or Firm—Tarolli, Sundheim, Covell & Tummino L.L.P.

(57) ABSTRACT

An apparatus (12) comprises an instrument panel (30) for a vehicle (10), an inflatable vehicle occupant protection device (60), and a deployment door (68). A portion (44) of the instrument panel (30) includes a rearwardmost point (54) of the instrument panel (30). The deployment door (68) includes a panel (72) that moves between a closed position and an open position on inflation of the protection device (60). An end (86) of the panel (72) is connected with the portion (44) of the instrument panel (30). The end (86) of the panel (72) is spaced from a farthest point on an end (84) of the panel (72) by a first distance (E). The rearwardmost point (54) is located in an imaginary vertical plane that is spaced horizontally from the end (86) of the panel (72) of the deployment door (68) by a second distance (D) that is greater than the first distance.

14 Claims, 4 Drawing Sheets

APPARATUS WITH SPECIFIED RELATIONSHIP BETWEEN AN INSTRUMENT PANEL AND A DEPLOYMENT DOOR

TECHNICAL FIELD

The present invention relates to an instrument panel and a deployment door that covers an opening in the instrument panel and opens during inflation of an inflatable vehicle occupant protection device.

BACKGROUND OF THE INVENTION

An occupant of a vehicle may be in various positions when an air bag inflates. During inflation of the air bag, a deployment door, which covers an opening in the instrument panel through which the air bag inflates, is forced open by the inflating air bag. Typically, when the deployment door is opened by the inflating air bag, one or more panels of the deployment door swing rearwardly into a passenger compartment of the vehicle.

It is desirable for the deployment door to be designed with relation to the instrument panel so that when the deployment door is opened, the panels of the deployment door do not contact the occupant of the vehicle. If contact is unavoidable due to the position of the occupant, such contact should preferably be in a location other than under the chin of the occupant.

SUMMARY OF THE INVENTION

The present invention is an apparatus comprising an instrument panel for a vehicle, an inflatable vehicle occupant protection device, and a deployment door. A portion of the instrument panel includes a rearwardmost point of the instrument panel. The deployment door has a closed position in which it covers a deployment opening in the instrument panel through which the inflatable vehicle occupant protection device inflates. The deployment door includes a panel that moves to an open position on inflation of the inflatable vehicle occupant protection device. The panel has a first end and a second end. The first end of the panel is connected with the portion of the instrument panel having the rearwardmost point. The second end of the panel moves rearward and toward the portion of the instrument panel having the rearwardmost point when the deployment door moves from the closed position to an open position. The first end of the panel is spaced from a farthest point on the second end of the panel by a first distance. The rearwardmost point of the instrument panel is located in an imaginary vertical plane that is spaced horizontally from the first end of the panel of the deployment door by a second distance that is greater than the first distance.

In another aspect of the present invention, a deployment door includes a panel that moves to an open position on inflation of the inflatable vehicle occupant protection device. The panel has a first end and a second end. The first end of the panel is connected with a first portion of the instrument panel. The second end of the panel moves toward the first portion of the instrument panel when the deployment door moves from the closed position to the open position. The first end of the panel is spaced from a farthest point on the second end of the panel by a first distance. The first end of the panel of the deployment door is spaced apart from a chin of an occupant by a second distance, which is greater than the first distance, when the occupant is positioned in accordance with one of sections 22.4.2 and 24.4.2 of Federal Motor Vehicle Safety Standard 208, as codified in 49 C.F.R. § 571.208 (2000), with the occupant's chest on the instrument panel. As a result, the occupant will not be contacted by the panel of the deployment door during movement of the deployment door from the closed position to an open position.

In yet another aspect of the present invention, a deployment door includes an upper panel, a lower panel, and a tear seam. The tear seam connects the upper panel to the lower panel when the deployment door is in the closed position. The tear seam ruptures and the upper and lower panels move to an open position on inflation of an inflatable vehicle occupant protection device. The tear seam is located above a chin of a seated occupant and a rearwardmost point of a lower portion of the instrument panel is located below the chin of the seated occupant when the occupant is positioned in accordance with one of sections 22.4.3 and 24.4.3 of Federal Motor Vehicle Safety Standard 208, as codified in 49 C.F.R. § 571.208 (2000), with the occupant's head on the instrument panel. As a result, the inflatable vehicle occupant protection device will not contact the occupant under the chin during inflation of the inflatable vehicle occupant protection device.

According to another aspect of the present invention, an apparatus comprises an instrument panel for a vehicle. The instrument panel includes an upper portion, a lower portion, and an intermediate portion that interconnects the upper and lower portions. The intermediate portion of the instrument panel extends in a vertical direction over a first distance measured along a vertical axis of the vehicle and extends in a horizontal direction over a second distance measured along a longitudinal axis of the vehicle. The longitudinal axis of the vehicle is parallel to a direction of travel of the vehicle. The first distance is equal to or greater than the second distance. One of the upper and lower portions of the instrument panel includes a rearwardmost point of the instrument panel. A deployment opening extends through the intermediate portion of the instrument panel. The deployment opening has upper and lower edges defining upper and lower boundaries of the intermediate portion of the instrument panel. The apparatus also comprises an inflatable vehicle occupant protection device that is actuatable to inflate through the deployment opening and a deployment door having a closed position in which the deployment door covers the deployment opening. The deployment door includes a deployment door panel that moves to an open position on inflation of the inflatable vehicle occupant protection device. The deployment door panel has a first end and a second end. The first end of the deployment door panel is connected with the portion of the instrument panel having the rearwardmost point. The second end of the deployment door panel moves rearward and toward the portion of the instrument panel having the rearwardmost point when the deployment door moves from the closed position to the open position. The first end of the deployment door panel is spaced from the second end of the deployment door panel by a third distance. The rearwardmost point of the instrument panel is spaced horizontally away from the first end of the deployment door panel by a fourth distance measured along the longitudinal axis of the vehicle that is greater than the third distance.

BRIEF DESCRIPTION OF THE DRAWINGS

The foregoing and other features of the present invention will become apparent to those skilled in the art to which the present invention relates upon reading the following description with reference to the accompanying drawings, in which.

DETAILED DESCRIPTION OF THE INVENTION

Figure 1:
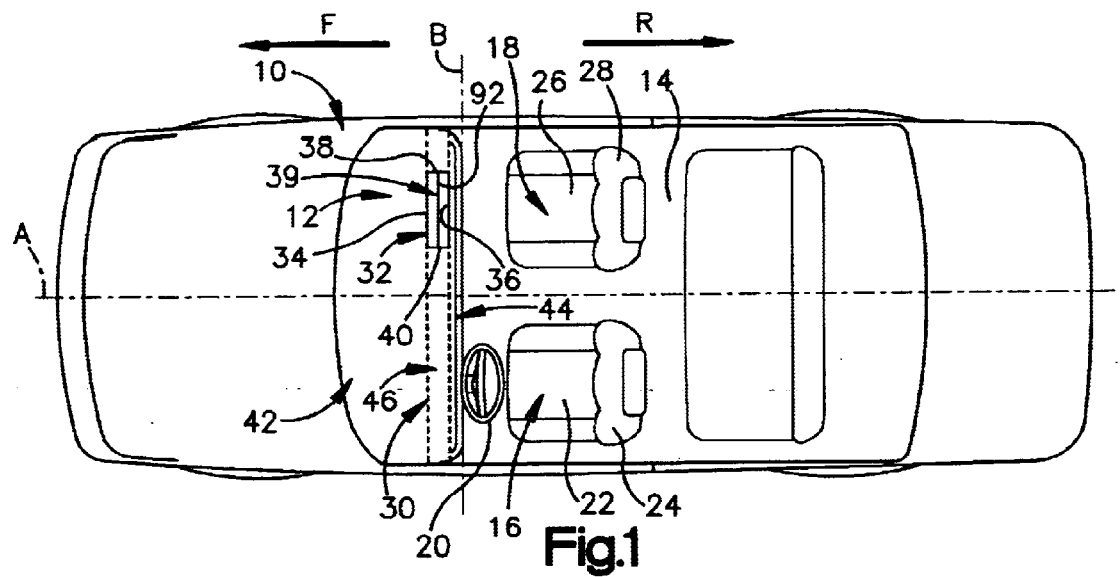
FIG. 1 is a schematic plan view of a vehicle including an apparatus constructed in accordance with the present invention.

FIG. 1 illustrates, in a schematic plan view, a vehicle 10 including an apparatus 12 constructed in accordance with the present invention. An axis A extends longitudinally through the vehicle 10. A longitudinal plane of the vehicle 10 extends vertically through axis A.

A passenger compartment 14 of the vehicle 10 includes a driver seat 16 and a passenger seat 18. The driver seat 16 is situated rearward of a steering wheel 20. The arrow R in FIG. 1 indicates the rearward direction, and the arrow F indicates the forward direction. The driver seat 16 includes a seat cushion 22 and a seat back 24. The passenger seat 18 is situated adjacent the driver seat 16. The passenger seat 18 also includes a seat cushion 26 and a seat back 28.

The apparatus 12 of the vehicle 10 includes an instrument panel 30. The instrument panel 30 is located in front of both the driver seat 16 and the passenger seat 18 of the vehicle 10. The instrument panel 30 extends in a direction perpendicular to axis A along axis B. An imaginary vertical plane extending through axis B will be referred to as the widthwise plane hereinafter.

A deployment opening 32 is defined in the instrument panel 30 and is centered, along axis B, relative to the passenger seat 18. The deployment opening 32 is defined by upper and lower hinge lines 34 and 36, respectively, and vertical tear lines 38 and 40 of an H-shaped tear seam 39.

For clarity of the description, the instrument panel 30 is said to include three portions. An upper portion 42 of the instrument panel 30 extends from the upper hinge line 34 toward a windshield 48 (FIGS. 2 and 3) of the vehicle 10. A lower portion 44 of the instrument panel 30 extends from the lower hinge line 36 toward a floor 45 (FIGS. 2 and 3) of the vehicle 10. An intermediate portion 46 of the instrument panel 30 extends between the upper portion 42 and the lower portion 44 and includes both vertical tear lines 38 and 40. The intermediate portion 46 of the instrument panel is illustrated in FIG. 1 as the area between the parallel dashed lines extending from each hinge line 34 and 36. As is shown with reference to FIGS. 2 and 4, the intermediate portion 46 of the illustrated instrument panel 30 extends vertically, relative to a vertical axis V (FIG. 2) of the vehicle 10, over a distance that is approximately equal to the distance that the intermediate portion 46 extends horizontally, relative to the longitudinal axis A (FIG. 1) of the vehicle 10.

Figure 4:
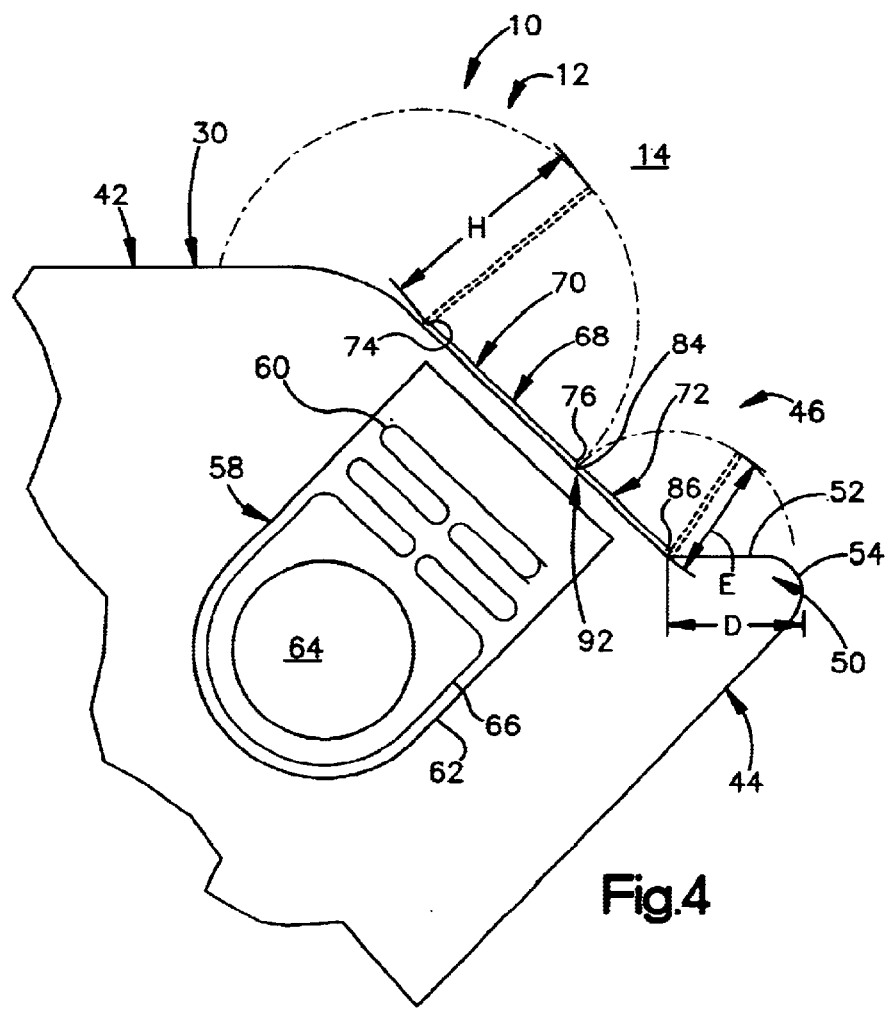
FIG. 4 is a schematic enlarged view of a portion of the apparatus of FIG. 1.

As best shown in FIG. 4, the lower portion 44 of the instrument panel 30 includes a rearward extending lip 50. The lip 50 also extends widthwise across the instrument panel 30. The rearward extending lip 50 includes an upper lip surface 52. The upper lip surface 52 extends from the lower hinge line 36 (FIG. 1) rearward and terminates at a rearwardmost point 54 of the instrument panel 30. The rearwardmost point 54 of the instrument panel 30 is located in the widthwise plane. Below the rearwardmost point 54, the lower portion 44 of the instrument panel 30 extends both downwardly and forward until terminating at a lower end 56 (FIGS. 2 and 3).

Figure 2:
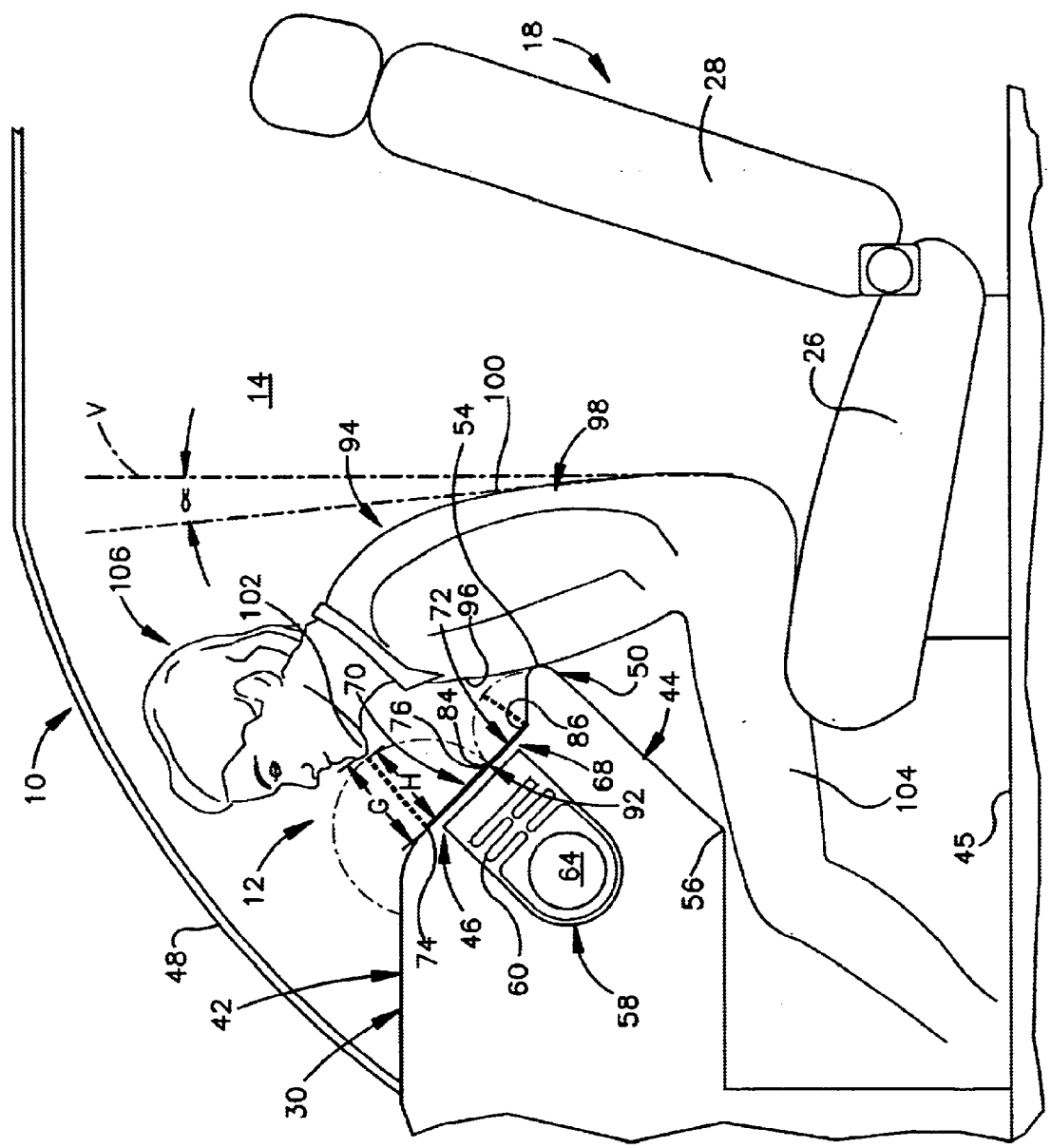
FIG. 2 is a schematic elevation view of an occupant of the vehicle in a first position relative to the apparatus of FIG. 1.
Figure 3:
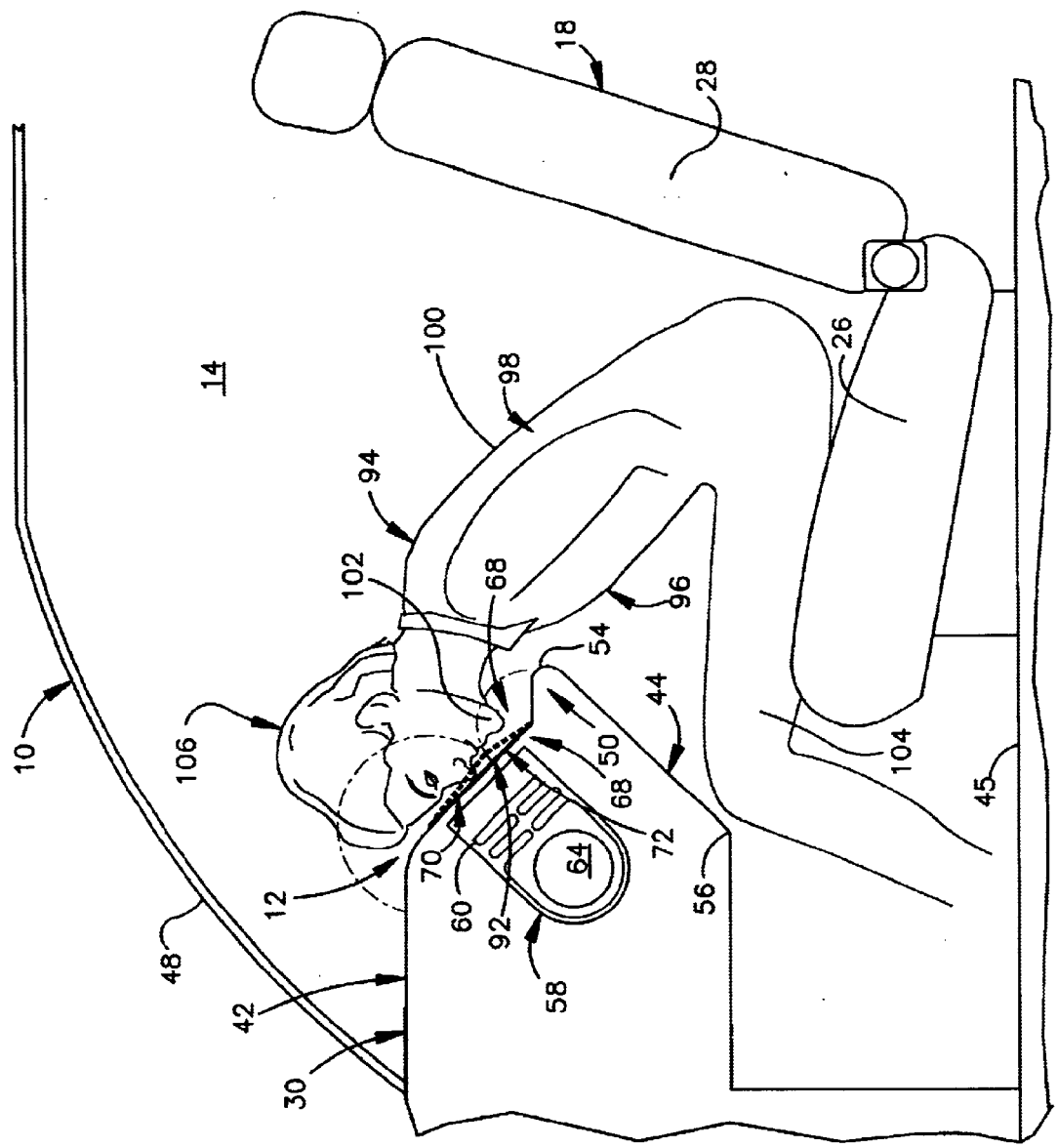
FIG. 3 is a schematic elevation view of an occupant of the vehicle in a second position relative to the apparatus of FIG. 1.

As shown in FIGS. 2–4, a module 58 including an inflatable vehicle occupant protection device 60 is attached to the instrument panel 30. The module 58 is positioned relative to the instrument panel 30 so that the inflatable vehicle occupant protection device 60, upon inflation, inflates through the deployment opening 32 (FIG. 1) and rearward into the passenger compartment 14 (FIG. 1) of the vehicle 10. The inflatable vehicle occupant protection device 60 inflates for the purpose of helping to protect an occupant of the vehicle 10 during a crash condition in which inflation of the vehicle occupant protection device 60 is desirable. The inflatable vehicle occupant protection device 60 illustrated in FIGS. 2–4 is an air bag, and the module 58 is an air bag module.

As shown in FIG. 4, the air bag module 58 includes a reaction can 62, an inflator 64, and the air bag 60. The reaction can 62 is attached to support structure (not shown) within the instrument panel 30 in a known manner. The inflator 64 is attached to the reaction can 62 in a known manner. The inflator 64 includes a source of inflation fluid. A mouth 66 of the air bag 60 is also attached to the reaction can 62. Upon actuation of the inflator 64, inflation fluid released from the inflator 64 enters the mouth 66 of the air bag 60 and causes the air bag 60 to inflate.

A deployment door 68 is located in the deployment opening 32 in the instrument panel 30. The deployment door 68 has a closed position and an open position. In the closed position, the deployment door 68 covers the deployment opening 32 in the instrument panel 30. In the open position, the deployment door 68 enables the air bag 60 to inflate through the deployment opening 32 in the instrument panel 30 and rearward into the passenger compartment 14 of the vehicle 10. A force generated by the inflating air bag 60 causes the deployment door 68 to move from the closed position to the open position.

The deployment door 68 includes an upper panel 70 and a lower panel 72. The upper panel 70 has an upper end 74 and a lower end 76. Preferably, the upper end 74 and the lower end 76 of the upper panel 70 extend parallel to one another. The upper end 74 of the upper panel 70 is preferably connected with the upper portion 42 of the instrument panel 30 at the upper hinge line 34 (FIG. 1). An upper hinge (not shown), such as a flexible piece of plastic, may be used to connect the upper end 74 of the upper panel 70 to the upper portion 42 of the instrument panel 30. Alternatively, the deployment door 68 may be connected to the reaction can 62 in such a manner that the door can effectively pivot about the upper hinge line 34. When the deployment door 68 is in the closed position, the lower end 76 of the upper panel 70 of the deployment door 68 preferably aligns with the intermediate portion 46 (FIG. 1) of the instrument panel 30 so that the upper panel 70 of the deployment door 68 is located in the same plane as the adjacent surfaces of the instrument panel 30.

The lower panel 72 also has an upper end 84 and a lower end 86. Preferably, the upper end 84 and the lower end 86 of the lower panel 72 extend parallel to one another. The lower end 86 of the lower panel 72 is preferably connected with the lower portion 44 of the instrument panel 30 at the lower hinge line 36 (FIG. 1). A lower hinge (not shown), such as a flexible piece of plastic, may be used to connect the lower end 86 of the lower panel 72 to the lower portion 44 of the instrument panel 30. Alternatively, the deployment door 68 may be connected to the reaction can 62 in such a manner that the door can effectively pivot about the lower hinge line 36. When the deployment door 68 is in the closed position, the upper end 84 of the lower panel 72 of the deployment door 68 preferably aligns with the intermediate portion 46 (FIG. 1) of the instrument panel 30 so that the lower panel 72 of the deployment door 68 is located in the same plane as the adjacent surfaces of the instrument panel 30.

When the deployment door 68 is in a closed position, a horizontal tear line 92 (FIG. 4) of the H-shaped tear seam 39 (FIG. 1) connects the lower end 76 of the upper panel 70 with the upper end 84 of the lower panel 72. The tear seam 39 is designed to rupture when subjected to the force generated by the inflating air bag 60.

Upon the occurrence of a crash condition of a magnitude for which inflation of the air bag 60 is desired, the inflator 64 of the air bag module 58 is actuated. Upon actuation, inflation fluid is released by the inflator 64 and enters the mouth 66 of the air bag 60. The inflation fluid begins to inflate the air bag 60. As the air bag 60 begins to inflate, the inflating air bag 60 presses against the upper and lower panels 70 and 72 of the deployment door 68. As the air bag 60 continues to inflate, pressure applied by the air bag 60 against the deployment door 68 causes the tear seam 39 to rupture. When the tear seam 39 ruptures, the air bag 60 begins to inflate through the deployment opening 32 in the instrument panel 30 and rearward into the passenger compartment 14 of the vehicle 10. As the air bag 60 inflates through the deployment opening 32, the upper and lower panels 70 and 72 of the deployment door 68 are moved from the closed position to the open position.

When moving to the open position, the lower end 76 of the upper panel 70 of the deployment door 68 moves toward the upper portion 42 of the instrument panel 30. Specifically, the upper panel 70 rotates about the upper hinge line 34, or the upper hinge if used, during movement to the open position. FIGS. 2–4 illustrate an arc of movement of the lower end 76 of the upper panel 70 during movement of the upper panel 70 from the closed position to the open position.

When moving to the open position, the upper end 84 of the lower panel 72 of the deployment door 68 moves rearward and toward the lower portion 44 of the instrument panel 30. Specifically, the lower panel 72 rotates about the lower hinge line 36, or the lower hinge if used, during movement to the open position. FIGS. 2–4 illustrate an arc of movement of the upper end 84 of the lower panel 72 during movement of the lower panel 72 from the closed position to the open position.

The apparatus 12 of the present invention is designed so that when an occupant 94 of the seat 18 is in a first position relative to the instrument panel 30, the deployment door 68 will open without contacting the occupant. When the occupant 94 is in a second position relative to the instrument panel 30, where contact from the deployment door 68 is unavoidable, the deployment door 68 will not contact the occupant under the chin. Both the first and the second positions are positions in which the occupant 94 is away from the seat back 28 of the seat 18. The exact positions are defined in Federal Motor Vehicle Safety Standard 208 (hereinafter "FMVSS 208"), which is codified at 49 C.F.R. § 571.208 (2000) and which is incorporated herein by reference in its entirety. FMVSS 208 refers to the first position as the "chest on instrument panel" position and describes this position in sections 22.4.2 and 24.4.2 of FMVSS 208. The second position is referred to as the "head on instrument panel position" and is described in sections 22.4.3 and 24.4.3 FMVSS 208.

In the first position, illustrated schematically in FIG. 2, the occupant 94 is seated on the passenger seat 18 such that a midsagittal plane of the occupant 94 is aligned longitudinally with the center of the horizontal tear line 92 of the tear seam 39 in the deployment door 68. A vertical midpoint of the rib plate of the occupant's chest 96 is aligned horizontally with the horizontal tear line 92 of the tear seam 39. The rear face 100 of the occupant's torso 98 is oriented in the range of zero degrees to six degrees forward of vertical (axis V), shown in FIG. 2 as angle $\alpha$. The occupant 94 is moved forward in the vehicle 10 until the occupant's chest 96 contacts the rearwardmost point 54 of the instrument panel 30.

The apparatus 12 of the present invention is designed using the following criteria with reference to the instrument panel 30 and to the occupant 94 positioned in the first position, illustrated schematically in FIG. 2.

(i) A horizontal distance D (FIG. 4), in a direction parallel to axis A (FIG. 1), separates the lower end 86 of the lower panel 72 of the deployment door 68, or the lower hinge if used, and the vertically extending widthwise plane in which the rearwardmost point 54 on the instrument panel 30 is located. A distance E (FIG. 4) separates the lower end 86 of the lower panel 72 of the deployment door 68, or the lower hinge if used, from the uppermost point on the upper end 84 of the lower panel 72 of the deployment door 68. The horizontal distance D is greater than distance E so that the lower panel 72 of the deployment door 68 will not contact the occupant 94 positioned in the first position when the deployment door 68 moves from the closed position to the open position, as shown in FIG. 2.

(ii) A distance G (FIG. 2) separates the upper end 74 of the upper panel 70 of the deployment door 68, or the upper hinge if used, and the chin 102 of the occupant 94 when the occupant 94 is positioned in the first position. A distance H (FIGS. 2 and 4) separates the upper end 74 of the upper panel 70 of the deployment door 68, or upper hinge if used, and the lowermost point on the lower end 76 of the upper panel 70 of the deployment door 68. The distance G is greater than the distance H so that the upper panel 70 of the deployment door 68 will not contact the occupant 94 positioned in the first position when the deployment door 68 moves from the closed position to the open position, as shown in FIG. 2.

In the second position of the occupant, illustrated schematically in FIG. 3, the occupant 94 is seated on the passenger seat 18 with the passenger seat 18 at a mid-height position. The midsagittal plane of the occupant 94 is aligned longitudinally with the center of the horizontal tear line 92 of the tear seam 39 in the deployment door 68. The occupant's feet (not shown) are placed flat on the vehicle floor with the occupant's legs 104 on the front of the seat cushion 26. The passenger seat 18 is moved forward until a portion of the occupant 94 contacts the instrument panel 30. If the seat 18 is in a forwardmost position and no portion of the occupant 94 contacts the instrument panel 30, the occupant 94 is leaned forward until either the occupant's torso 98 or the occupant's head 106 contacts the instrument panel 30. As shown in FIG. 3, the occupant's head 106 contacts the instrument panel 30.

The apparatus 12 of the present invention is designed using the following criterion with reference to the occupant 94 in the second position, illustrated schematically in FIG. 3.

(i) The horizontal tear line 92 of the tear seam 39 of the deployment door 68 is above the chin 102 of the occupant 94 and the rearwardmost point 54 of the lower portion 44 of the instrument panel 30 is below the chin 102 of the occupant 94. With the occupant's chin 102 interposed between the horizontal tear line 92 of the tear seam 39 and the rearwardmost point 54 of the instrument panel 30, an inflating air bag 60 will not contact the occupant 94 positioned in the second position under the chin 102 during inflation. Also, the panels 70 and 72 of the deployment door 68, when moving from the closed position to the open position, will not contact the occupant 94 under the chin 102. Thus, when the occupant 94 is positioned in the second position and contact from the deployment door 68 is unavoidable, the deployment door 68 will not contact the occupant under the chin 102.

Figure 5:
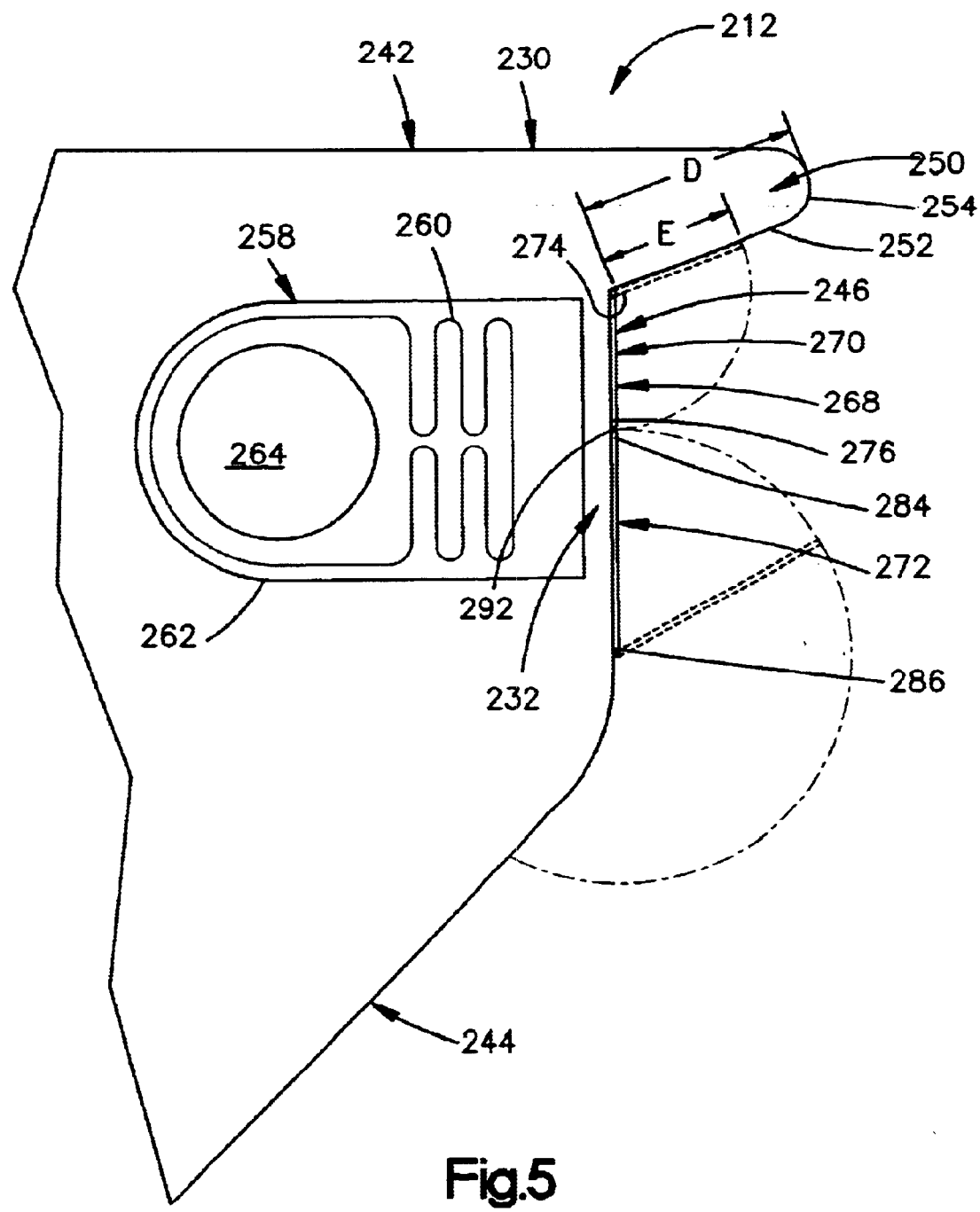
FIG. 5 is a schematic view of an alternative embodiment of an apparatus constructed in accordance with the present invention.

FIG. 5 shows an alternate embodiment of an apparatus 212 constructed in accordance with the present invention. The apparatus 212 includes an instrument panel 230 having an upper portion 242 and a lower portion 244. The upper portion 242 of the instrument panel 230 includes a rearward extending lip 250. The lip 250 also extends widthwise across the instrument panel 230. The rearward extending lip 250 includes a lower lip surface 252. The lower lip surface 252 extends from an upper hinge line (not shown) rearward and terminates at a rearwardmost point 254 of the instrument panel 230. The rearwardmost point 254 of the instrument panel 230 is located in the widthwise plane. Above the rearwardmost point 254, the upper portion 242 of the instrument panel 230 extends rearward toward a windshield (not shown) of the vehicle.

A module 258 including an inflatable vehicle occupant protection device 260 is attached to the instrument panel 230. The module 258 is positioned relative to the instrument panel 230 so that the inflatable vehicle occupant protection device 260, upon inflation, inflates through a deployment opening 232 and rearward into the passenger compartment 214 of the vehicle. The inflatable vehicle occupant protection device 260 inflates for the purpose of helping to protect an occupant of the vehicle during a crash condition in which inflation of the vehicle occupant protection device 260 is desirable. The inflatable vehicle occupant protection device 260 illustrated in FIG. 5 is an air bag, and the module 258 is an air bag module. The air bag module 258 is of known construction and includes a reaction can 262, an inflator 264, and the air bag 260.

A deployment door 268 is located in the deployment opening 232 in the intermediate portion 246 of the instrument panel 230. Similarly to the intermediate portion 46 of FIG. 2, the intermediate portion 246 of the instrument panel 230 of FIG. 5 is defined between the upper and lower hinge lines (not shown) of the deployment door. In FIG. 5, both the deployment door 268 and the intermediate portion 246 of the instrument panel 230 extend vertically. The deployment door 268 has a closed position and an open position. In the closed position, the deployment door 268 covers the deployment opening 232 in the instrument panel 230. In the open position, the deployment door 268 enables the air bag 260 to inflate through the deployment opening 232 in the instrument panel 230 and rearward into the passenger compartment 214 of the vehicle. A force generated by the inflating air bag 260 causes the deployment door 268 to move from the closed position to the open position.

The deployment door 268 includes an upper panel 270 and a lower panel 272. The upper panel 270 has an upper end 274 and a lower end 276. The upper end 274 of the upper panel 270 connects with the lower lip surface 252 of the rearward extending lip 250 of the instrument panel 230 at the upper hinge line. An upper hinge (not shown), such as a flexible piece of plastic, may be used to connect the upper end 274 of the upper panel 270 to the lower lip surface 252. Alternatively, the deployment door 268 may be connected to the reaction can 262 in such a manner that the door can effectively pivot about the upper hinge line. When the deployment door 268 is in the closed position, the deployment door 268 is preferably located in the same plane as the adjacent surfaces of the instrument panel 230.

The lower panel 272 also has an upper end 284 and a lower end 286. Preferably, the upper end 284 and the lower end 286 of the lower panel 272 extend parallel to one another. The lower end 286 of the lower panel 272 is preferably connected with the lower portion 244 of the instrument panel 230 at a lower hinge line (not shown). A lower hinge (not shown), such as a flexible piece of plastic, may be used to connect the lower end 286 of the lower panel 272 to the lower portion 244 of the instrument panel 230. Alternatively, the deployment door 268 may be connected to the reaction can 262 in such a manner that the door can effectively pivot about the lower hinge line. When the deployment door 268 is in the closed position, the deployment door 268 is preferably located in the same plane as the adjacent surfaces of the instrument panel 330.

When the deployment door 268 is in a closed position, a horizontal tear line 292 of an H-shaped tear seam connects the lower end 276 of the upper panel 270 with the upper end 284 of the lower panel 272. The tear seam is designed to rupture when subjected to the force generated by the inflating air bag 260.

Upon the occurrence of a crash condition of a magnitude for which inflation of the air bag 260 is desired, the inflator 264 of the air bag module 258 is actuated. Upon actuation, inflation fluid is released by the inflator 264 and enters the air bag 260. The inflation fluid begins to inflate the air bag 260. As the air bag 260 begins to inflate, the inflating air bag 260 presses against the upper and lower panels 270 and 272 of the deployment door 268. As the air bag 260 continues to inflate, pressure applied by the air bag 260 against the deployment door 268 causes the tear seam to rupture. When the tear seam ruptures, the air bag 260 begins to inflate through the deployment opening 232 in the instrument panel 230 and rearward into the passenger compartment of the vehicle. As the air bag 260 inflates through the deployment opening 232, the upper and lower panels 270 and 272 of the deployment door 268 are moved from the closed position to the open position.

When moving to the open position, the lower end 276 of the upper panel 270 of the deployment door 268 moves toward the lower lip surface 252 of the lip 250 of the instrument panel 30. Specifically, the upper panel 270 rotates about the upper hinge line, or the upper hinge if used, during movement to the open position. FIG. 5 illustrates an arc of movement of the lower end 276 of the upper panel 270 during movement of the upper panel 270 from the closed position to the open position.

When moving to the open position, the upper end 284 of the lower panel 272 of the deployment door 268 moves rearward and toward the lower portion 244 of the instrument panel 230. Specifically, the lower panel 272 rotates about the lower hinge line, or the lower hinge if used, during movement to the open position. FIG. 5 illustrates an arc of movement of the upper end 284 of the lower panel 272 during movement of the lower panel 272 from the closed position to the open position.

As discussed above with reference to apparatus 12, apparatus 212 is also designed so that when an occupant of a seat is in the first position relative to the instrument panel 230, the deployment door 268 will open without contacting the occupant. When the occupant is in the second position relative to the instrument panel 230, where contact from the deployment door 268 is unavoidable, the deployment door 268 will not contact the occupant under the chin. Both the first and the second positions are positions in which the occupant is away from the seat back of the seat. The exact positions are defined in Federal Motor Vehicle Safety Standard 208 (hereinafter "FMVSS 208"), which is codified at 49 C.F.R. § 571.208 (2000) and which is incorporated herein by reference in its entirety. FMVSS 208 refers to the first position as the "chest on instrument panel" position and describes this position in sections 22.4.2 and 24.4.2 of FMVSS 208. The second position is referred to as the "head on instrument panel position" and is described in sections 22.4.3 and 24.4.3 FMVSS 208.

The apparatus 212 of the present invention is designed using the similar criteria as were set forth above with reference to apparatus 12. Specifically, with reference to the instrument panel 230 and to an occupant (not illustrated in FIG. 5) positioned in the first position, the criteria for apparatus 212 are as follows:

(i) A horizontal distance D separates the upper end 274 of the upper panel 270 of the deployment door 268, or the upper hinge if used, and the vertically extending widthwise plane in which the rearwardmost point 254 on the instrument panel 230 is located. A distance E separates the upper end 274 of the upper panel 270 of the deployment door 268, or the upper hinge if used, from the lowermost point on the lower end 276 of the upper panel 270 of the deployment door 268. The horizontal distance D is greater than distance E so that the upper panel 270 of the deployment door 268 will not contact the occupant positioned in the first position when the deployment door 268 moves from the closed position to the open position, as shown in FIG. 2.

(ii) Due to the location of the rearward extending lip 250 with respect to the upper panel 270 of the deployment door 268 of apparatus 212, the upper panel 270 of the deployment door 268 will not contact the occupant positioned in the first position when the deployment door 268 moves from the closed position to the open position. Additionally, when the occupant is in the second position, the upper panel 270 of the deployment door 268 will not contact the occupant under the chin. The location of the rearward extending lip 250 with respect to the upper panel 270 of the deployment door 268 of apparatus 212 prevents contact with the occupant's chin.

From the above description of the invention, those skilled in the art will perceive improvements, changes and modifications. Such improvements, changes and modifications within the skill of the art are intended to be covered by the appended claims.

For purposes of full disclosure, sections 22.4 and 24.4 of FMVSS 208, as codified at 49 C.F.R. § 571.208 (2000), are reproduced below:

§ 22.4 Low Risk Deployment Tests
§ 22.4.1 Each vehicle that is certified as complying with § 21.4 shall meet the following test requirements with the 49 CFR Part 572, Subpart P 3-year-old child dummy in both of the following positions: Position 1 (S22.4.2) and Position 2 (S22.4.3).
§ 22.4.1.1 Locate and mark the center point of the dummy's chest/rib plate (the vertical mid-point of the frontal chest plate of the dummy on the midsagittal plane). This is referred to as "Point 1."
§ 22.4.1.2 Locate the vertical plane parallel to the vehicle longitudinal centerline through the geometric center of the right front air bag tear seam. This is referred to as "Plane D."
§ 22.4.1.3 Locate the horizontal plane through the geometric center of the right front air bag tear seam. This is referred to as "Plane C."
§ 22.4.2 Position 1 (chest on instrument panel).
§ 22.4.2.1 There are no seat track, seat height, or seat back angle requirements.
§ 22.4.2.2 Place the dummy's midsagittal plane coincident with Plane D.
§ 22.4.2.3 Initially position the thighs at a right angle to the spine and the legs at a right angle to the thighs. These angles may be adjusted to the extent necessary for the head and torso to attain their final positions.
§ 22.4.2.4 With the dummy's thorax instrument cavity rear face vertical and Point 1 in Plane C, move the dummy forward until Point 1 contacts the instrument panel. If the dummy's head contacts the windshield and keeps Point1 from contacting the instrument panel, lower the dummy until there is no more than 5 mm (0.2 in) clearance between the head and the windshield.
§ 22.4.2.5 Position the upper arms parallel to the spine and rotate the lower arms forward (at the elbow joint) sufficiently to prevent contact with or support from the seat.
§ 22.4.2.6 Position the legs of the dummy so that the legs are vertical and the feet rest flat on the floorboard (or the feet are positioned parallel to the floorboard) of the vehicle.
§ 22.4.2.7 Use the seat adjustments (fore-aft, height) to keep the dummy in position. If necessary, thread with a maximum breaking strength of 311 N (70 lb) and spacer blocks may be used to support the dummy in position. The thread should support the torso rather than the head. Support the dummy so that there is minimum interference with the full rotational and translational freedom for the upper torso of the dummy and the thread does not interfere with the air bag.
§ 22.4.3 Position 2 (head on instrument panel).
§ 22.4.3.1 Place the passenger seat in the full rearward seating position. Place the seat back in the manufacturer's nominal design seat back angle for a 50th percentile adult male as specified in § 8.1.3. If adjustable in the vertical direction, place the seat in the mid-height position.
§ 22.4.3.2 Place the dummy in the front passenger seat such that:
§ 22.4.3.2.1 The dummy's midsagittal plane is coincident with Plane D. With the thighs on the seat, initially set the thighs perpendicular to the torso and the legs perpendicular to the thighs. Position the upper arms parallel to the torso and rotate the lower arms forward (at the elbow) sufficiently to prevent contact with or support from the seat.
§ 22.4.3.2.2 The dummy is positioned in the seat such that the legs rest against the front of the seat and such that the dummy's thorax instrument cavity rear face is vertical. If it is not possible to position the dummy with the legs in the prescribed position, rotate the legs forward until the dummy is resting on the seat with the feet positioned flat on the floorboard.

§ 22.4.3.3 Move the seat forward, while maintaining the thorax instrument cavity rear face orientation until any part of the dummy contacts the vehicle's instrument panel.

§ 22.4.3.4 If contact has not been made with the vehicle's instrument panel at the full forward seating position of the seat, slide the dummy forward on the seat 190 mm (7.5 in) or until contact is made, whichever is first. Maintain the thorax instrument cavity rear face vertical orientation.

§ 22.4.3.5 If contact has not been made, apply a force towards the front of the vehicle on the spine of the dummy between the shoulder joints until the head or torso comes into contact with the vehicle's instrument panel.

§ 22.4.3.6 If necessary, rotate the thighs and rotate the legs and feet so as not to impede the motion of the head/torso into the vehicle's instrument panel.

§ 22.4.3.7 Rotate the lower arms forward if necessary to prevent contact with or support from the seat.

§ 22.4.3.8 If necessary, thread with a maximum breaking strength of 311 N (70 lb) and spacer blocks may be used to support the dummy in position. The thread should support the torso rather than the head. Support the dummy so that there is minimum interference with the full rotational and translational freedom for the upper torso of the dummy and the thread does not interfere with the air bag.

§ 22.4.4 Deploy the right front outboard frontal air bag system. If the frontal air bag system contains a multi-stage inflator, the vehicle shall be able to comply with the injury criteria at any stage or combination of stages or time delay between successive stages that could occur in a rigid barrier crash test at or below 26 km/h (16 mph), under the test procedure specified in § 22.5.

§ 24.4 Low Risk Deployment Tests

§ 24.4.1 Each vehicle that is certified as complying with § 23.4 shall meet the following test requirements with the 49 CFR Part 572 Subpart N 6-year-old child dummy in both of the following positions: Position 1 (§ 24.4.2) or Position 2 (§ 24.4.3).

§ 24.4.1.1 Locate and mark the center point of the dummy's rib cage or sternum plate (the vertical mid-point of the frontal chest plate of the dummy on the midsagittal plane). This is referred to as "Point 1."

§ 24.4.1.2 Locate the vertical plane parallel to the vehicle longitudinal centerline through the geometric center of the right front air bag tear seam. This is referred to as "Plane D."

§ 24.4.1.3 Locate the horizontal plane through the geometric center of the right front air bag tear seam. This is referred to as "Plane C."

§ 24.4.2 Position 1 (chest on instrument panel).

§ 24.4.2.1 There are no seat track, seat height, or seat back angle requirements.

§ 24.4.2.2 Remove the legs of the dummy at the pelvic interface.

§ 24.4.2.3 Place the dummy's midsagittal plane coincident with Plane D.

§ 24.4.2.4 With the dummy's thorax instrument cavity rear face 6 degrees forward of the vertical and Point 1 in Plane C, move the dummy forward until Point 1 contacts the instrument panel. If the dummy's head contacts the windshield and keeps Point 1 from contacting the instrument panel, lower the dummy until there is no more than 5 mm (0.2 in) clearance between the head and the windshield.

§ 24.4.2.5 Position the upper arms parallel to the spine and rotate the lower arms forward (at the elbow joint) sufficiently to prevent contact with or support from the seat.

§ 24.4.2.6 Use the seat adjustments (fore-aft, height) to keep the dummy in position. If necessary, thread with a maximum breaking strength of 311 N (70 lb) and spacer blocks may be used to support the dummy in position. The thread should support the torso rather than the head. Support the dummy so that there is minimum interference with the full rotational and translational freedom for the upper torso of the dummy and the thread does not interfere with the air bag.

§ 24.4.3 Position 2 (head on instrument panel).

§ 24.4.3.1 Place the passenger seat in the full rearward seating position. Place the seat back in the nominal design position for a 50th percentile adult male (§ 8.1.3) as specified by the vehicle manufacturer. If adjustable in the vertical direction, place the seat in the mid-height position.

§ 24.4.3.2 Place the dummy in the front passenger seat such that:

§ 24.4.3.2.1 The dummy's midsagittal plane is coincident with Plane D. With the thighs on the seat, initially set the thighs perpendicular to the torso and the legs perpendicular to the thighs. Position the upper arms parallel to the torso and rotate the lower arms forward (at the elbow) sufficiently to prevent contact with or support from the seat.

§ 24.4.3.2.2 The dummy is positioned in the seat such that the legs rest against the front of the seat and such that the dummy's thorax instrument cavity rear face is 6 degrees forward of vertical. If it is not possible to position the dummy with the legs in the prescribed position, rotate the legs forward until the dummy is resting on the seat with the feet positioned flat on the floorboard.

§ 24.4.3.3 Move the seat forward, while maintaining the thorax instrument cavity rear face orientation until any part of the dummy contacts the vehicle's instrument panel.

§ 24.4.3.4 If contact has not been made with the vehicle's instrument panel at the full forward seating position of the seat, slide the dummy forward on the seat 190 mm (7.5 in) or until contact is made, whichever is first. Maintain the thorax instrument cavity rear face orientation.

§ 24.4.3.5 If contact has not been made, apply a force towards the front of the vehicle on the spine of the dummy between the shoulder joints until the head or torso comes into contact with the vehicle's instrument panel.

§ 24.4.3.6 If necessary, rotate the thighs and rotate the legs and feet so as not to impede the motion of the head/torso into the vehicle's instrument panel.

§ 24.4.3.7 Rotate the lower arms forward if necessary to prevent contact with or support from the seat.

§ 24.4.3.8 If necessary, thread with a maximum breaking strength of 311 N (70 lb) and spacer blocks may be used to support the dummy in position. Thread should support the torso rather than the head. Support the dummy so that there is minimum interference with the full rotational and translational freedom for the upper torso of the dummy and the thread does not interfere with the air bag.

§ 24.4.4 Deploy the right front outboard frontal air bag system. If the frontal air bag system contains a multi-stage inflator, the vehicle shall be able to comply with the injury criteria at any stage or combination of stages and at any time delay between successive stages that could occur in a rigid barrier crash at speeds up to 26 km/h (16 mph) under the test procedure specified in § 22.5.

Having described the invention, we claim the following:

1. An apparatus comprising:

an instrument panel for a vehicle, a portion of the instrument panel including a rearwardmost point of the instrument panel;

an inflatable vehicle occupant protection device; and a deployment door in the instrument panel having a closed position in which the deployment door covers a deployment opening through which the inflatable vehicle occupant protection device inflates, the deployment door including a deployment door panel that moves to an open position on inflation of the inflatable vehicle occupant protection device, the deployment door panel having a first end and a second end, the first end of the deployment door panel being connected with the portion of the instrument panel having the rearwardmost point, the second end of the deployment door panel moving rearward and toward the portion of the instrument panel having the rearwardmost point when the deployment door moves from the closed position to an open position, the first end of the deployment door panel being spaced from the second end of the panel by a first distance, the rearwardmost point of the instrument panel being spaced horizontally from the first end of the deployment door panel by a second distance that is greater than the first distance, wherein the deployment door panel is adapted to move from the closed position to the open position without contacting an occupant, positioned in accordance with one of sections 22.4.2 and 24.4.2 of Federal Motor Vehicle Safety Standard 208, as codified in year 2000 in 49 C.F.R. 571.208, with chest on the instrument panel.

2. The apparatus as defined in claim 1 wherein the rearwardmost point of the instrument panel is located on a lower portion of the instrument panel, the deployment door panel being a lower panel of the deployment door, the first end of the deployment door panel being a lower end and the second end being an upper end.

3. The apparatus as defined in claim 2 wherein the deployment door further includes an upper panel that moves to an open position on inflation of the inflatable vehicle occupant protection device, the upper panel having an upper end and a lower end, the upper end of the upper panel being connected with an upper portion of the instrument panel, the lower end of the upper panel moving toward the upper portion of the instrument panel when the deployment door moves from the closed position to the open position, the upper panel of the deployment door being adapted to move toward the upper portion of the instrument panel without contacting a chin of the occupant when a front face of a torso of the occupant is contacting the rearwardmost point of the lower portion of the instrument panel and a rear face of the torso of the occupant is oriented in the range of zero degrees to six degrees forward of vertical.

4. The apparatus as defined in claim 2 wherein the deployment door in the instrument panel further includes an upper panel, the upper panel having an upper end and a lower end, the upper end of the upper panel being connected with an upper portion of the instrument panel, the lower end of the upper panel moving toward the upper portion of the instrument panel when the deployment door moves from the closed position to the open position, a tear seam connecting the lower end of the upper panel to the upper end of the lower panel when the deployment door is in the closed position, the tear seam rupturing and the upper and lower panels moving to an open position on inflation of the inflatable vehicle occupant protection device, the tear seam being located on the deployment door so as to be located vertically above a chin of the occupant when the occupant is leaned forward until a first one of a head and a torso of the occupant contacts the instrument panel.

5. The apparatus as defined in claim 1 wherein the rearwardmost point of the instrument panel is located on an upper portion of the instrument panel, the deployment door panel being an upper panel, the first end being an upper end and the second end being a lower end that is spaced vertically below the upper end.

6. The apparatus as defined in claim 5 wherein the deployment door further includes a lower panel that moves to an open position on inflation of the inflatable vehicle occupant protection device, the lower panel having a lower end and an upper end that is spaced vertically above the lower end, the lower end of the lower panel being connected with a lower portion of the instrument panel, the upper end of the lower panel moving toward the lower portion of the instrument panel when the deployment door moves from the closed position to the open position, the lower end of the lower panel of the deployment door being adapted to move toward the lower portion of the instrument panel without contacting a chin of the occupant when a front face of a torso of the occupant is contacting the rearwardmost point of the upper portion of the instrument panel and a rear face of the torso of the occupant is oriented in the range of zero degrees to six degrees forward of vertical.

7. An apparatus comprising:

an instrument panel for a vehicle having a first portion and a second portion, the second portion of the instrument panel including a rearwardmost point of the instrument panel;

an inflatable vehicle occupant protection device; and a deployment door in the instrument panel having a closed position in which the deployment door covers a deployment opening through which the inflatable vehicle occupant protection device inflates, the deployment door including a deployment door panel that moves to an open position on inflation of the inflatable vehicle occupant protection device, the deployment door panel having a first end and a second end, the first end of the deployment door panel being connected with the first portion of the instrument panel, the second end of the deployment door panel moving toward the first portion of the instrument panel when the deployment door moves from the closed position to an open position, the deployment door panel being adapted to move to the open position without contacting a chin of an occupant when the occupant is positioned in accordance with one of sections 22.4.2 and 24.4.2 of Federal Motor Vehicle Safety Standard 208, as codified in year 2000 in 49

C.F.R. 571.208, with chest on the instrument panel so that the occupant will not be contacted by the deployment door panel during movement of the deployment door from the closed position to the open position.

8. The apparatus as defined in claim 7 wherein the rearwardmost point is located on a lower portion of the instrument panel, the deployment door panel being an upper panel, and the first end being an upper end and the second end being a lower end.

9. The apparatus as defined in claim 8 wherein the deployment door further includes a lower panel that moves to an open position on inflation of the inflatable vehicle occupant protection device, the lower panel having a lower end and an upper end, the lower end of the lower panel being connected with the lower portion of the instrument panel, the upper end of the lower panel moving rearward and toward the lower portion of the instrument panel when the deployment door moves from the closed position to the open position, the lower end of the lower panel being spaced from the upper end of the lower panel by a first distance, the rearwardmost point of the instrument panel being spaced horizontally away from the lower end of the lower panel of the deployment door by a second distance that is greater than the first distance.

10. The apparatus as defined in claim 7 wherein the rearwardmost point is located on an upper portion of the instrument panel, the deployment door panel being a lower panel, and the first end being a lower end and the second end being an upper end.

11. The apparatus as defined in claim 10 wherein the deployment door further includes an upper panel that moves to an open position on inflation of the inflatable vehicle occupant protection device, the upper panel having a lower end and an upper end, the upper end of the upper panel being connected with the upper portion of the instrument panel, the lower end of the upper panel moving rearward and toward the upper portion of the instrument panel when the deployment door moves from the closed position to the open position, the upper end of the upper panel being spaced from the lower end of the upper panel by a first distance, the rearwardmost point of the instrument panel being spaced horizontally away from the upper end of the upper panel of the deployment door by a second distance that is greater than the first distance.

12. An apparatus comprising:

an instrument panel for a vehicle, a lower portion of the instrument panel including a rearwardmost point of the instrument panel;

an inflatable vehicle occupant protection device; and a deployment door in the instrument panel having a closed position in which the deployment door covers a deployment opening through which the inflatable vehicle occupant protection device inflates, the deployment door including an upper panel and a lower panel, a tear seam connecting the upper panel to the lower panel when the deployment door is in the closed position, the tear seam rupturing and the upper and lower panels moving to an open position on inflation of the inflatable vehicle occupant protection device, the tear seam being located on the deployment door so as to be located vertically above a chin of an occupant positioned with head on the instrument panel in accordance with one of sections 22.4.3 and 24.4.3 of Federal Motor Vehicle Safety Standard 208, as codified in year 2000 in 49 C.F.R. 571.208 so that the inflatable vehicle occupant protection device will not contact the occupant under the chin during inflation of the inflatable vehicle occupant protection device.

13. The apparatus as defined in claim 12 wherein the lower panel has a lower end and an upper end, the lower end of the lower panel being connected with the lower portion of the instrument panel, the upper end of the lower panel moving rearward and toward the lower portion of the instrument panel when the deployment door moves from the closed position to an open position, the lower end of the lower panel being spaced from the upper end of the lower panel by a first distance, the rearwardmost point of the instrument panel being spaced horizontally away from the lower end of the lower panel of the deployment door by a second distance that is greater than the first distance.

14. An apparatus comprising:

an instrument panel for a vehicle including an upper portion, a lower portion, and an intermediate portion that interconnects the upper and lower portions, the intermediate portion of the instrument panel extending in a vertical direction over a first distance measured along a vertical axis of the vehicle and extending in a horizontal direction over a second distance measured along a longitudinal axis of the vehicle, the longitudinal axis of the vehicle being parallel to a direction of travel of the vehicle, the first distance being equal to or greater than the second distance, one of the upper and lower portions of the instrument panel including a rearwardmost point of the instrument panel, a deployment opening extending through the intermediate portion of the instrument panel, the deployment opening having upper and lower edges defining upper and lower boundaries of the intermediate portion of the instrument panel;

an inflatable vehicle occupant protection device that is actuatable to inflate through the deployment opening; and a deployment door having a closed position in which the deployment door covers the deployment opening, the deployment door including a deployment door panel that moves to an open position on inflation of the inflatable vehicle occupant protection device, the deployment door panel having a first end and a second end, the first end of the deployment door panel being connected with the portion of the instrument panel having the rearwardmost point, the second end of the deployment door panel moving rearward and toward the portion of the instrument panel having the rearwardmost point when the deployment door moves from the closed position to the open position, the first end of the deployment door panel being spaced from the second end of the deployment door panel by a third distance, the rearwardmost point of the instrument panel being spaced horizontally away from the first end of the deployment door panel by a fourth distance measured along the longitudinal axis of the vehicle that is greater than the third distance.

* * * * *